3,457,313
METHOD FOR THE PREPARATION OF N,N-DI-
METHYLOL AMINOALCOHOLS AND N,N-DI-
METHYL AMINOALCOHOLS
Thomas Nelson Baker III, Philadelphia, Pa., assignor to
The Atlantic Richfield Company, Philadelphia, Pa., a
corporation of Pennsylvania
No Drawing. Filed Feb. 15, 1966, Ser. No. 527,475
Int. Cl. C07c 91/02
U.S. Cl. 260—584                                5 Claims

ABSTRACT OF THE DISCLOSURE

Method for the preparation of N,N-dimethylol amino-
alcohols and N,N-dimethyl aminoalcohols by reacting
2-hydroxyamines with an aqueous formaldehyde solution
to give the dimethylol aminoalcohols which are reduced
to the corresponding N,N-dimethyl aminoalcohols by
hydrogen in the presence of a nickel catalyst.

---

This invention relates to a method for the preparation
of N,N-dimethylol aminoalcohols and N,N-dimethyl
aminoalcohols from 2-hydroxyamines and more particu-
larly it relates to a method for converting 2-hydroxy-
amines to N,N-dimethylol aminoalcohols utilizing an
aqueous formaldehyde solution and reducing the N,N-
dimethylol aminoalcohols to N,N-dimethyl aminoalcohols
by hydrogen in the presence of a nickel catalyst.

Heretofore N,N-dimethylol aminoalcohols have been
prepared by reacting a 2-hydroxyamine with paraform-
aldehyde. Since the principal utility of the N,N-dimethylol
aminoalcohols is as intermediates in the preparation of
the N,N-dimethyl aminoalcohols, the dimethylol de-
rivatives are, in general, not isolated but instead are im-
mediately reduced to the corresponding N,N-dimethyl
aminoalcohols. This has been carried out by the use of
an inert solvent together with hydrogen and a hydrogena-
tion catalyst.

In another process a primary amine (an anilin deriva-
tive) is reacted with an aqueous formaldehyde solution
together with hydrochloric acid. After the catalytic re-
duction step the solution is neutralized in order to obtain
the N,N-dimethyl amine derivative.

In recent years the lower molecular weight N,N-di-
methyl aminoalcohols have become available in commer-
cial quantities, i.e. in the millions of pounds per year
quantities. The lower molecular weight N,N-dimethyl
aminoalcohols, for example dimethyl aminoethanol and
1-dimethyl amino-2-propanol have been found to be par-
ticularly useful as specialty solvents and as intermediates
in a number of syntheses, particularly in the production
of pharmaceutical products. The higher molecular weight
N,N-dimethyl aminoalcohols, for example those contain-
ing from about 10 carbon atoms up to about 18 carbon
atoms have been found to be particularly suitable both
as foam builders for detergent compositions and as inter-
mediates in the production of foam builders, for example
these high molecular weight N,N-dimethyl aminoalcohols
can be reacted with hydrogen peroxide in accordance with
conventional procedures to produce the oxide of the cor-
responding N,N-dimethyl aminoalcohol. These amine
oxides are also particularly useful as foam builders in
synthetic detergent compositions. Although these uses for
the higher molecular weight compounds have been pat-
ented, they have not as yet been produced in commercial
quantities primarily because of their high cost when pro-
duced from paraformaldehyde. It now has been found
that contrary to the teachings in the prior art processes,
the N,N-dimethylol aminoalcohols may be produced by
reacting the corresponding 2-hydroxyamine with commer-
cially available aqueous solutions of formaldehyde known
in the trade as formalin. The dimethylol derivative so
produced can be reduced readily to give high yields of
the N,N-dimethyl aminoalcohol utilizing gaseous hydro-
gen and a nickel hydrogenation catalyst.

It is an object of this invention therefore to provide an
improved method for the production of N,N-dimethylol
aminoalcohols.

It is another object of this invention to provide an im-
proved method for the production of N,N-dimethyl amino-
alcohols.

It is another object of this invention to provide a method
for preparing N,N-dimethyl aminoalcohols from the cor-
responding 2-hydroxyamine utilizing aqueous formalde-
hyde followed by catalytic reduction.

Other objects of this invention will be apparent from
the following description and from the claims.

In accordance with this invention a 2-hydroxyamine
having the formula

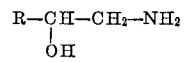

wherein the R may be hydrogen or an alkyl group having
from 1 to 24 carbon atoms is dissolved in an aliphatic
monohydroxy alcohol having from 1 to 3 carbon atoms
in the molecule, i.e. methanol, ethanol or propanol. The
alcohol solution of the hydroxyamine is then reacted
with aqueous formaldehyde at relatively low temperatures
to produce the N,N-dimethylol derivative. The dimethylol
derivative contained in the alcohol-water solution is re-
duced by the use of a nickel catalyst and in the presence
of an excess of hydrogen. The catalyst is filtered from
the hot reactant solution. The filtrate is usually dried, for
example, over magnesium sulfate, and evaporated to give
a residue of crude product. Benzene is utilized to dissolve
the N,N-dimethyl aminoalcohol and the solution is again
filtered. The benzene filtrate solution is evaporated to
give a second crude product which is distilled to yield
the pure N,N-dimethyl aminoalcohol product having the
formula

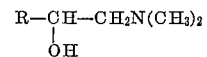

wherein R is the same group as in the hydroxyamine used
as the starting material. It will be understood, however,
that modifications to this recovery technique may be
employed in accordance with methods well known to
those skilled in the art.

Although the 2-hydroxyamines may be simply ethanol-
amine or a compound wherein the R radical of the formula
set forth above is an alkyl radical having from 1 to 24
carbon atoms, the method of preparation according to
the instant invention is particularly applicable to 2-hy-
droxyamines wherein the R radical is an alkyl radical
having from 2 to 14 carbon atoms, i.e. 2-hydroxy butyl-
amine, to 2-hydroxy hexadecylamine.

The solvent which is utilized to dissolve the hydroxy-
amine must also be a solvent for all of the reactants. It
has been found that aliphatic monohydroxy alcohols hav-
ing from 1 to 3 carbon atoms, i.e. methanol, ethanol and
propanol are solvents for the 2-hydroxyamines which
may be utilized in this invention and in addition are sol-
vents for the other reactants, i.e. aqueous formaldehyde,
and the N,N-dimethylol derivative. Although the quantity
of alcohol solvent is not critical, in general it is preferred
to utilize from about 6 liters to about 10 liters of the
alcohol per mole of the 2-hydroxyamine.

The aqueous formaldehyde is a commercial solution
well known in the trade as formalin. This aqueous solu-
tion may contain from 25 percent to 40 percent of
formaldehyde. The quantity of formalin should be such
that there are at least 2 moles of formaldehyde for each
mole of 2-hydroxyamine. A slight excess, i.e. 0.1 moles or less, may be employed, however, a large excess is simply destroyed and is, therefore, uneconomical. The catalyst utilized for the hydrogenation reaction wherein the N,N-dimethylol derivative is reduced to the dimethyl derivative is preferably a nickel hydrogenation catalyst. It may be either Raney nickel or a supported nickel catalyst such as nickel or kieselguhr or nickel on activated carbon. All such catalysts are commercially available and are well known in the hydrogenation art. Other metal hydrogenation catalysts are not preferred because of their tendency to produce lower yields of the final product. The amount of nickel catalyst (as nickel metal) may range as low as 1 gram per mole of the 2-hydroxyamine starting material or less, to 50 grams per mole in accordance with known conventional hydrogenation procedures.

Sufficient hydrogen should be supplied to the reaction in order to amount to at least 2 moles per mole of the N,N-dimethylol derivative, preferably an excess of this amount should be employed. In general, a hydrogen pressure of at least 30 p.s.i.g. is used. Higher pressures may be utilized, but it is seldom desirable to go much above 100 p.s.i.g.

The reaction of the formalin with the 2-hydroxyamine is preferably carried out at a temperature in the range of from 25° C. to 80° C., the most preferred range being from 40° C. to 60° C. The reduction reaction also is preferably carried out at 20° C. to 80° C. High temperatures and excessively high pressures are not preferred in the reduction reaction since they will cause the solvent to react with amine.

The following examples are provided to illustrate specific embodiments of the invention but are not to be construed as limiting the invention thereto.

EXAMPLE I

A solution of 6.4 grams (0.025 mole) of 2-hydroxy hexadecylamine in 200 ml. of ethanol was heated to 40° C. To this solution, 4.1 grams of 37 percent formalin (0.05 mole of formaldehyde) was added with stirring. The reaction was exothermic and the temperature increased to about 50° C. To this hot solution of the N,N-dimethylol derivative was added 2.5 grams of Raney nickel which had been wetted with ethanol (approximately 1 gram of dry metal). The mixture was reduced with hydrogen at a pressure of 60 p.s.i.g. in a Parr shaker apparatus at about 50° C. It was found that the hydrogen consumption was approximately 90 percent of the theoretical amount required to reduce the N,N-dimethylol derivative if the reaction between the 2-hydroxyamine and formaldehyde had been quantitative. The catalyst was filtered from the hot solution and the catalyst was washed by agitation with ethanol containing a small amount of hydrochloric acid. The wash solution was filtrated from the catalyst, neutralized with a slight excess of sodium hydroxide and combined with the original product filtrate. The product solution was dried over magnesium sulfate and thereafter was evaporated to give a residue of the crude product and inorganic salts. Benzene was added to this crude product to dissolve the N,N-dimethyl-2-hydroxy hexadecylamine and the solution filtered to separate it from the inorganic salts. The benzene solution was evaporated to 6.5 grams of a crude viscous oil. This oil was analyzed by gas chromatography and it was found that the crude product contained 82 weight percent of the desired product (the N,N-dimethyl-2-hydroxy hexadecylamine). This yield corresponded to an 80 percent yield based on the amount of hydroxyamine starting material. The crude product was distilled to yield the pure N,N-dimethyl-2-hydroxy-hexadecylamine having a boiling range of 125°–128° C. at 0.1 mm. mercury pressure. The yield of product recovered was 78 weight percent based on the amount of hydroxyamine starting material.

To a solution of 11.9 grams (0.05 mole) of hexadecyl- amine in 230 ml. of ethanol at 40° C. was added with stirring 8.2 grams of 37 percent formalin (0.1 mole of formaldehyde). About 2.5 grams of commercial Raney nickel wet with ethanol was added and the mixture reduced at 50° C. with hydrogen at a pressure of 60 p.s.i.g. in a Parr shaker apparatus. The hydrogen consumption amounted to about 80 percent of that required for theoretical reduction of the dimethylol derivative. The catalyst was filtered from the hot solution and the hot solution was combined with the ethanol solution which had been used to wash the catalyst as described in Example I. The combined solutions were evaporated to give a crude semi-solid weighing 12.0 grams. Infrared analysis showed considerable amounts of unreacted hexadecylamine admixed with both the N-mono- and N,N-dimethyl-hexadecylamine. When this product was distilled at reduced pressure only traces of N,N-dimethyl-hexadecylamine could be obtained, showing that the instant method is not applicable to the aliphatic primary amines.

EXAMPLE III

To 12.2 grams (0.2 mole) of ethanolamine (2-aminoethanol) dissolved in 150 ml of ethanol at 45° C. was added with stirring 32.8 grams of 37 percent formalin (0.4 mole of formaldehyde). The reaction was exothermic and the temperature increased to 60° C. over a 10–15 minute period. To the hot reaction mixture was added 2.5 grams Raney nickel catalyst wet with ethanol. Hydrogen was introduced into the mixture contained in a Parr shaker apparatus to a pressure of 65 p.s.i.g. at a temperature of between 50° C. and 55° C. The hydrogen consumption was found to be 100 percent of theoretical based on the quantity of N,N-dimethylol derivative that would have been present if the reaction between the ethanol amine and the formaldehyde were quantitative. The catalyst was filtered from the hot solution and the catalyst was washed as described in Example I. The wash solution was added to the product filtrate and the combined solutions were distilled at reduced pressure. The distillation of the crude product gave 9.3 grams of N,N-dimethyl ethanolamine having a boiling range of 63° C. to 66° C. at 60 mm. mercury pressure. This corresponded to a yield of about 55 percent based on the ethanolamine starting material.

EXAMPLE IV

Another experiment was carried out wherein 2-hydroxypropylamine was substituted for the ethanolamine of Example III. The reaction was carried out in the identical manner to produce the N,N-dimethyl-2-hydroxypropylamine. A yield of 45 percent of the product based on the starting material was obtained. The product had a boiling point range of 60–63° C. at 70 mm. of mercury pressure.

Examples I, III and IV demonstrate the operability of the process for the production of the N,N-dimethylamino alcohol from the corresponding 2-hydroxyamine. No attempts were made to optimize the reaction conditions to produce maximum yields, however, it was found from these experiments and from similar experiments that optimum reaction conditions were within the ranges which have been set forth and that in addition, supported nickel catalysts could be utilized instead of Raney nickel, for example, nickel on kieselguhr or nickel on carbon.

The reaction between the 2-hydroxyamine and the formaldehyde in aqueous solution is extremely rapid so that if it is desired to reduce the N,N-dimethylol derivative, the nickel catalyst can be added to the reaction mixture immediately following the completion of the addition of the formaldehyde and the reduction can be started by the introduction of hydrogen. In order to be certain, however, that the reaction between the formaldehyde and the hydroxyamine is as complete as possible it is preferable to add the nickel catalyst and hydrogen after 5 to 10 minutes have elapsed following the formaldehyde introduc- tion.

I claim:
1. A method for the preparation of a N,N-dimethyl aminoalcohol from a hydroxyamine having the formula

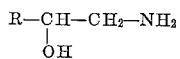

wherein R may be hydrogen or an alkyl radical having from 1 to 24 carbon atoms, said hydroxyamine being dissolved in an aliphatic monohydroxy alcohol having from 1 to 3 carbon atoms, selected from the group consisting of methanol, ethanol and propanol, which comprises contacting said hydroxyamine solution with an aqueous formaldehyde solution at a temperature of from 25° C. to 80° C. to produce the N,N-dimethylol aminoalcohol, adding a nickel hydrogenation catalyst to the reaction mixture containing the N,N-dimethylol aminoalcohol, adding sufficient hydrogen to raise the pressure to at least 30 p.s.i.g., and recovering the N,N-dimethyl aminoalcohol so produced.

2. The method according to claim 1 wherein R is hydrogen.

3. The method according to claim 1 wherein R is a methyl radical.

4. The method according to claim 1 wherein R is an alkyl radical having from 2 to 14 carbon atoms.

5. The method according to claim 1 wherein the nickel catalyst is Raney nickel.

References Cited
UNITED STATES PATENTS

| | | | |
|---|---|---|---|
| 2,219,879 | 10/1940 | Vanderbilt | 260—583 |
| 2,419,506 | 4/1947 | Senkus | 260—584 X |
| 2,445,356 | 7/1948 | Kharasch | 260—584 X |
| 3,223,734 | 12/1965 | Fallstad | 260—583 |

JOSEPH P. BRUST, Primary Examiner

R. L. RAYMOND, Assistant Examiner